United States Patent [19] [11] 3,836,725
Celestini [45] Sept. 17, 1974

[54] SCANNER FOR AUTOMATIC TELEPHONE EXCHANGES

[75] Inventor: Nadios Celestini, Milan, Italy

[73] Assignee: GTE International Incorporated, Stamford, Conn.

[22] Filed: Oct. 10, 1972

[21] Appl. No.: 295,968

[30] Foreign Application Priority Data
Feb. 12, 1972 Italy .................................. 19256/72

[52] U.S. Cl. ............................................. 179/18 FG
[51] Int. Cl. ............................................. H04m 3/22
[58] Field of Search ...................... 179/18 FF, 18 FG

[56] References Cited
UNITED STATES PATENTS

| | | | |
|---|---|---|---|
| 3,202,767 | 8/1965 | Warman | 179/18 FG |
| 3,551,603 | 12/1970 | Haugk | 179/18 FG |

*Primary Examiner*—Thomas W. Brown
*Attorney, Agent, or Firm*—Robert T. Orner

[57] ABSTRACT

A scanner for repetitively sampling each of a group of telephone circuits to determine whether they are busy or free. The scanner employs a first terminal set containing a selected number of terminals, a second terminal set containing a like number of terminals and scanning means disposed between these sets. Each first set terminal is at a first potential when its circuit is free and at a second potential when its circuit is busy. Each second set terminal is at a third potential when the corresponding circuit is free. The means scans each first terminal in turn to locate the first terminal in the first set which identifies a free circuit. At this point the scanning means discontinues the scanning action and changes the potential of the corresponding second set terminal to indicate that the corresponding circuit is free. The action is cyclical. The means includes a number of like stages, each stage being coupled between a corresponding first set terminal and a corresponding second set terminal. Each stage includes a read relay and a thyristor. The scanner operates much faster than conventional electromechanical scanners.

14 Claims, 2 Drawing Figures

FIG. I

SCANNER FOR AUTOMATIC TELEPHONE EXCHANGES

BACKGROUND OF THE INVENTION

Automatic telephone exchanges often employ a first set of spaced terminals each of which is connected to a corresponding line. When the line is not in use or is free, the potential on the corresponding terminal has a first value.

When the line is in use, as for example, when a subscriber is connected thereto to make a call, the potential on the corresponding terminal will change to a second value. Associated with the first terminal set can be a second set containing a like plurality of terminals each of which is associated with a corresponding first set terminal. Each second set terminal will be maintained at a potential having a third value when its corresponding first set terminal is connected to a free line. The potential on a second set terminal is to be changed to a fourth value when its corresponding first set is connected to a busy line. Such a change in potential, for example, can be used to initiate further operations in the completion of a call.

It is economically undesirable to provide means associated with each first set terminal-second set terminal pair to change the potential at a second set terminal each time the potential on the corresponding first set terminal changes value. Instead, scanners are used for this purpose, one scanner cooperating with all of the terminals of both sets.

There are two types of scanners-electronic and electromechanical. Electronic scanners provide very high speed operation and can scan a large number of terminals. However, when electronic scanners are employed in electromechanical exchanges, complex and expensive additional circuits called "interface circuits" are required. While electromechanical scanners do not utilize interface circuitry when used in electromechanical exchanges, electromechanical scanners now employ complicated additional circuitry utilizing make-before-break or preliminary contacts to provide reliable operation and avoid "relay chatter" and other associated malfunctions.

I have invented a new type of scanner which, while somewhat slower in operation than electronic scanners, is much faster than conventional electromechanical scanners. My scanner does not use any interface circuitry and also does not use preliminary contacts. It is relatively inexpensive and provides long term highly reliable operation.

SUMMARY OF THE INVENTION

In my invention, scanning means is interposed between first and second sets of spaced terminals. Each set contains a like number of terminals. Each first set terminal can be associated with a corresponding line and, depending upon the state of its line, is either at a first fixed potential or at a second fixed potential. Each second set terminal is associated with a corresponding first set contact. The first set contacts are normally at the first potential. The second set contacts are normally at a third potential.

The scanning means, periodically actuated for a fixed period, scans each first set terminal in sequence to locate the first terminal in the first set which is at the second potential and which is designated as the selected terminal. The scanning means discontinues the scanning action when the selected terminal is located, and also causes the potential of the second set terminal corresponding to the selected terminal of the first set to change to a different fixed value. This last condition continues until the expiration of the period.

The scanning means includes a plurality of like stages, each of which is associated with a corresponding one of each of the first and second set terminals and which includes a high speed relay means, typically reed relay means, as well as a controlled rectifier such as a thyristor.

DETAILED DESCRIPTION OF PREFERRED EMBODIMENTS

Figure 1:
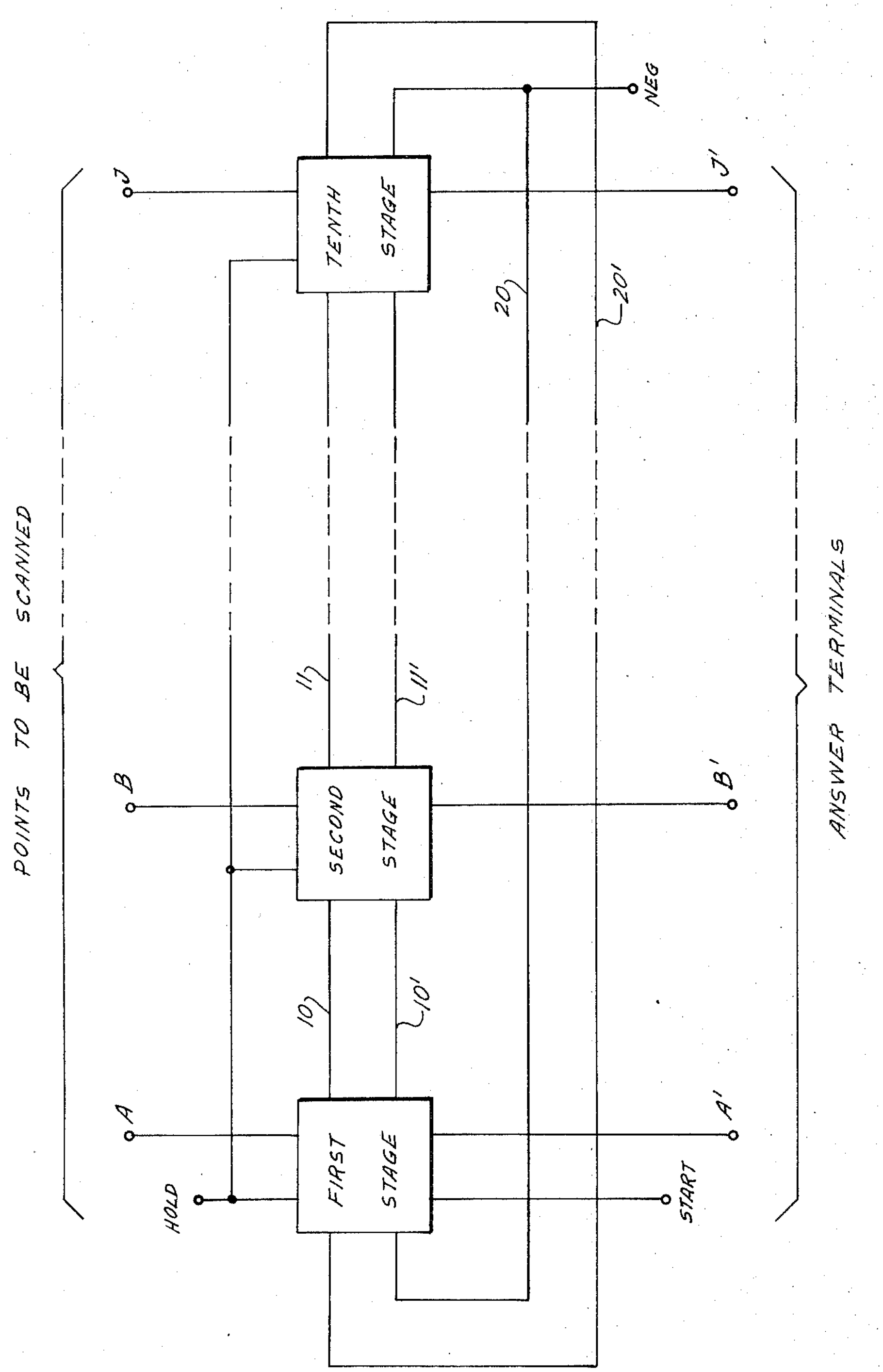
FIG. 1 is a block diagram of my invention.

Referring first to FIG. 1, there is shown a first set of spaced terminals, identified by letters (A, B . . . J) and the legend "points to be scanned." There is also shown a second set of spaced terminals identified by letters ($A^1$, $B^1$ . . . $J^1$) and the legend "answer terminals." Thus, for each first set terminal, there is a corresponding second set terminal.

There is also shown a plurality of stages, equal in number to the number of terminals in each of the two sets. There are ten stages shown in FIGS. 1 and 2. Each stage is connected between a corresponding first set terminal and a corresponding second set terminal. For example, the first stage is connected between terminals A and $A^1$.

All of the stages are connected in common to one additional terminal identified as the HOLD terminal. Each stage other than the highest stage is connected to the next higher stage by a pair of conductors. The highest stage is connected to the lowest stage by a pair of conductors. For example, the first stage is connected to the second stage by conductors 10 and $10^1$ and the tenth stage is connected to the first stage by a pair of conductors 20 and $20^1$. Conductor $20^1$ is also connected to a NEG terminal. Another terminal labelled START is connected to the first stage.

Normally, all of the first set terminals are at a first selected potential, as for example being isolated from battery, and all of the second set terminals are at a different selected potential, as for example, being isolated from ground. The scanner is to periodically scan all first set terminals to locate the first of these terminals, the designated terminal, which attains a different potential such as a fixed negative potential and to then stop scanning operation at the point for the remainder of the period. At the same time, the potential of the second set terminal corresponding to the designated first set terminal is changed to a different value, as for example being grounded.

In operation, the length of the period of scan or scanning cycle is determined by applying a suitable negative potential to the HOLD terminal for the desired length of time. The cycle is initiated by applying this potential and at the same instant, applying a ground potential to the START terminal for the same length of time. If terminal A is at a negative potential, the first stage is actuated and remains actuated for the entire cycle or period of scan. The first stage then grounds terminal $A^1$ for the same period. The remaining stages remain deactuated.

If terminal A is isolated from battery, the first stage is not actuated, but the second stage is scanned. This process continues through each stage in sequence until a stage is actuated or the highest stage is scanned. At this point, the negative potential is removed from the HOLD terminal and the apparatus remains deactuated until the next cycle is begun. If a cycle is completed without finding a first set terminal at a negative potential, the NEG terminal is grounded to indicate that no first set terminal at a negative potential could be found.

Figure 2:
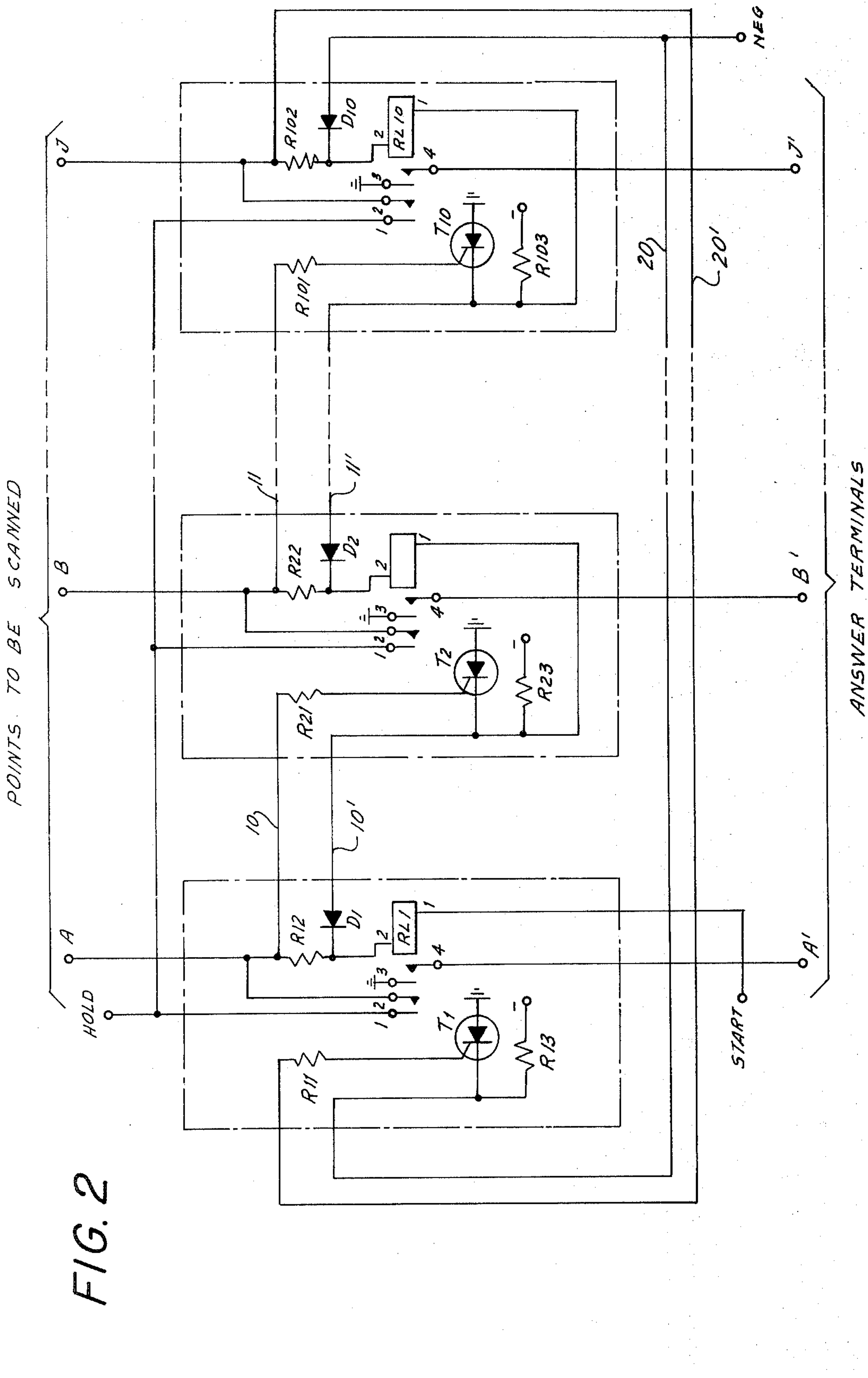
FIG. 2 is a schematic diagram thereof.

FIG. 2 illustrates the detailed circuitry. Each stage is provided with a reed relay winding (shown as RL1, RL2 . . . RL10) controlling a first set of normally open contacts 1 and 2 and a second set of normally open contacts 3 and 4. Each first terminal, (A, B . . . J), is connected through a corresponding resistor, (R12, R22 . . . R102), both to the corresponding reed relay winding as well as through a corresponding solid state rectifier (D1, D2 . . . D10) to the cathode of a corresponding controlled rectifier (T2, . . . T10, T1) of the next following stage. Typically, the controlled rectifier can be of the type known commercially as a thyristor. Its anode is grounded. In this discussion, the term "next following stage" as applied to the first and tenth stages means that the first stage is the next following stage for the tenth stage.

Each terminal (A, B . . . J) is connected to the contact 2 of its corresponding stage. The HOLD terminal is connected to contacts 1 of all stages. The contacts 3 of all stages are grounded. The contact 4 of each stage is connected to a corresponding one of terminals ($A^1$, $B^1$ . . . $J^1$).

The cathode of each thyristor is connected through a corresponding resistor (R13, R23 . . . R103) to a point of fixed negative potential and is also connected to the winding of the relay of the same stage other than in the first stage where the relay winding is connected to the START terminal. Each first terminal is also connected through a corresponding resistor (R21, . . . R101, R11) to the gate electrode of the thyristor of the following stage. Each thyristor is normally nonconductive.

In operation a potential is supplied to the START terminal, as for example by grounding it for the period of the scanning cycle.

At the same time, a negative potential is applied to the HOLD terminal. This potential remains thereat for the period of the scanning cycle.

If terminal A is at a negative potential, the start potential will energize relay winding RL1. Contacts 1 and 2 will be closed, completing a holding circuit which will maintain relay RL1 in the energized state for the entire period of the scanning cycle. At the same time, contacts 3 and 4 will be closed, grounding terminal $A^1$. This completes the scanning operation for the cycle. The negative potential at contact A is applied via resistor R21 to the gate electrode of thyristor T2, whereby this thyristor does not conduct. When the period is completed, both HOLD and START potentials are removed and the relay is deenergized. The next cycle begins when the appropriate potentials are again applied to the HOLD and START terminals.

If terminal A is isolated from battery, relay RL1 remains deenergized. However, a circuit is completed via the grounded START terminal, the winding of relay RL1, resistor R12, conductor 10 and resistor R21 to the gate of thyristor T2. Thyristor T2 is triggered into conduction. This action effectively grounds one side of the winding relay RL2 which represents the application of an equivalent of a start potential to the second stage. The triggering action effectively grounds the first set terminal of the preceding stage, in this case terminal A, whereby the first stage is disabled and will not be actuated should a delayed negative potential appear at terminal A. Then either the relay winding RL2 will be energized and the scan stopped as described above or the sequence is continued with the thyristor of each stage being triggered into conduction when the preceding stage has not been actuated.

When all the stages have been scanned with a negative result, the thyristor T1 is triggered and grounds the NEG terminal.

What is claimed is:

1. Scanning apparatus comprising:

a first terminal set containing a first plurality of spaced terminals, each first set terminal being either at a first potential or at a second and different potential and normally being at said first potential;

a second terminal set containing a like plurality of spaced terminals, said second set terminals being normally at a third potential; and scanning means interposed between said first and second sets, said means, when actuated for a fixed period, scanning each first set terminal in sequence to locate the first terminal in the first set which is at said first potential and which is designated as the selected terminal, said means discontinuing the scanning action when said selected terminal is located, said means changing the potential of the second set terminal corresponding to the selected terminal from the third potential to a different fixed value during the interval between the instant at which the selected terminal is located and the expiration of the fixed period, said means including a plurality of like stages, each stage being connected between a corresponding first set terminal and a corresponding second set terminal and being normally deactuated, the state corresponding to the selected terminal being actuated to discontinue the scanning action and remaining actuated until the expiration of the period.

2. Apparatus of claim 1 wherein each stage includes high speed relay means, the relay means being energized when the stage is actuated and being otherwise deenergized.

3. Apparatus of claim 2 wherein each relay means includes a winding and two sets of reed contacts, each set containing two contacts, the set being open when its contacts are separated and being closed when these contacts are interconnected.

4. Apparatus of claim 3 wherein both contact sets are normally open.

5. Apparatus of claim 4 wherein one of the two contact sets in each stage provides a holding circuit for the associated winding.

6. Apparatus of claim 5 wherein the other of the two contact sets in each stage is connected between a point of fixed potential and the second set terminal coupled to the said each stage.

7. Apparatus of claim 6 wherein one end of the winding of each stage is connected through a corresponding controlled rectifier in said each stage to the cathode electrode of a controlled rectifier in the next following stage, wherein the one end of the winding of said each stage is connected through corresponding resistance means to the gate of the control rectifier in the next following stage, and wherein the anode of the control rectifier is connected to a source of reference potential.

8. Apparatus of claim 7 wherein the one end of the winding of said each stage is coupled to the first set terminal coupled to said each stage.

9. Apparatus of claim 8 further including a HOLD terminal, one contact in each of the said one contact sets being connected directly to the HOLD terminal.

10. Apparatus of claim 9 wherein the other end of the winding in each stage, other than the first stage, is connected to the cathode electrode of the controlled rectifier of the same stage.

11. Apparatus of claim 10 further including a START terminal connected to the other end of the winding in the first stage.

12. Apparatus of claim 11 wherein each resistance means includes a first resistor in the said each stage and a second resistor in the stage immediately following.

13. Apparatus of claim 12 wherein the first potential corresponds to the terminal being isolated from battery, said different fixed value is ground, and said second potential is a negative potential with respect to ground potential. 6

14. Apparatus of claim 13 wherein the anode electrode of each controlled rectifier is grounded.

* * * * *